United States Patent [19]

Treadway

[11] 3,728,560

[45] Apr. 17, 1973

[54] BISTABLE MULTIVIBRATOR CIRCUIT

[75] Inventor: Ronald L. Treadway, Scottsdale, Ariz.

[73] Assignee: Motorola, Inc., Franklin Park, Ill.

[22] Filed: Dec. 23, 1971

[21] Appl. No.: 211,508

Related U.S. Application Data

[63] Continuation-in-part of Ser. No. 110,863, Jan. 29, 1971, abandoned, Continuation-in-part of Ser. No. 110,932, Jan. 29, 1971, abandoned.

[52] U.S. Cl. ..................307/289, 307/213, 307/215, 307/225 R, 307/235 R

[51] Int. Cl.........................H03k 3/286, H03k 21/06

[58] Field of Search......................307/208, 213, 214, 307/215, 218, 225, 235 R, 289, 290; 330/30 D, 69

[56] References Cited

UNITED STATES PATENTS

| | | | |
|---|---|---|---|
| 3,424,928 | 1/1969 | Priel et al. | 307/289 X |
| 3,440,449 | 4/1969 | Priel et al. | 307/289 X |
| 3,445,780 | 5/1969 | Beelitz | 330/30 D X |
| 3,517,211 | 6/1970 | Firth | 307/289 X |
| 3,522,446 | 8/1970 | Kodama | 307/215 |
| 3,539,831 | 11/1970 | Gilbert | 307/235 |
| 3,550,040 | 12/1970 | Sinusas | 330/30 D X |
| 3,573,488 | 4/1971 | Beelitz | 307/215 X |
| 3,612,911 | 10/1971 | Kroos | 307/213 X |
| 3,644,758 | 2/1972 | Matsue | 307/291 |

FOREIGN PATENTS OR APPLICATIONS

| | | | |
|---|---|---|---|
| 1,012,868 | 12/1965 | Great Britain | 307/215 |

*Primary Examiner*—Herman Karl Saalbach
*Assistant Examiner*—L. N. Anagnos
*Attorney*—Foorman L. Mueller et al.

[57] ABSTRACT

A bistable multivibrator circuit which is readily adaptable to monolithic integrated circuit technology combines the master and slave portions, reducing the components needed to provide a master/slave circuit operation when the multivibrator is used either as a frequency divider or as a gated logic circuit.

9 Claims, 8 Drawing Figures

| | CLOCK 31 IS LOW | CLOCK 31 GOES HIGH |
|---|---|---|
| INFORMATION INPUT 55 | OUTPUT VOLTAGE 60 | OUTPUT VOLTAGE 60 |
| 0 | 0 | 0 |
| 1 | 0 | 1 |
| 0 | 1 | 0 |
| 1 | 1 | 1 |

INVENTOR.
Ronald Llewellyn Treadway
BY Mueller & Aichele
ATTY'S.

BISTABLE MULTIVIBRATOR CIRCUIT

RELATED APPLICATIONS

This application is a continuation-in-part of copending applications, Ser. Nos. 110,863 and 110,932, both filed on Jan. 29, 1971, now abandoned.

BACKGROUND OF THE INVENTION

Bistable multivibrators fabricated as monolithic integrated circuits often comprise separate master and slave sections with the circuit interconnections and inputs to the multivibrator determining whether the multivibrator is operated as a frequency divider or as a gated logic circuit. Generally, each of the master and slave sections is supplied with operating current from a separate constant current source; and because of the duplication required for the master and slave sections, the multivibrators include a relatively large number of components.

It is desirable to reduce the number of components which are required to implement a master/slave bistable multivibrator function.

SUMMARY OF THE INVENTION

Accordingly, it is an object of this invention to provide an improved bistable multivibrator circuit.

It is another object of this invention to reduce the number of components in a master/slave emitter-coupled flip-flop circuit.

It is another object of this invention to use common current sources for both sections of a master/slave bistable multivibrator circuit.

It is a further object of this invention to utilize common current sources for both sections of a master/slave emitter coupled flip-flop circuit.

In accordance with the preferred embodiment of this invention, a bistable multivibrator is comprised of first and second sections each having at least two transistors. The second section also has an additional transistor, with the collectors of all of the transistors in the first and second sections being coupled with a first voltage supply terminal. The emitters of the transistors in the two sections are alternately coupled to a current source through different outputs of a current steering gate operated in accordance with input or clock signals. Emitter-follower feedback transistors apply feedback signals to the bases of transistors in each of the sections. The feedback for the second section is controlled by the collector of another of the transistors in that same section, and the feedback for the first section is controlled by one of the transistors in that section and one of the transistors in the second section. The conductivities of the two transistors in the second section which are coupled with the bases of the feedback transistors vary in the same manner.

DETAILED DESCRIPTION

Figures 1, 2:
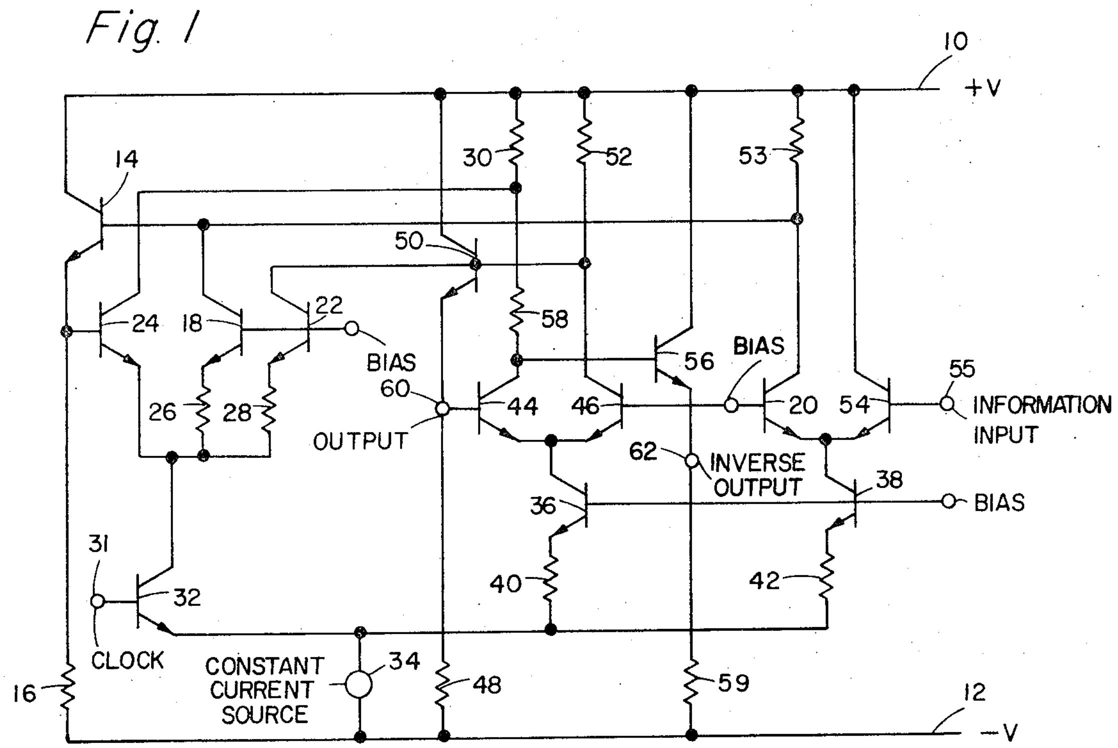
FIG. 1 is a schematic diagram of an embodiment of this invention.
FIG. 2 is a table of input, clock and resultant output voltages for the circuit of FIG. 1.

In the circuits shown in the drawings, the same reference numbers are used to designate the same or similar components throughout the several Figures.

Turning first to FIG. 1, the positive terminal of a power supply (not shown) may be connected to terminal 10 and the negative terminal of the power supply may be connected to terminal 12. The collector of an NPN transistor 14 is connected to the terminal 10 and the emitter of the transistor 14 is connected to the terminal 12 by way of resistor 16. Since all transistors to be mentioned hereinafter are of the NPN type, no further mention will be made as to the type thereof. The base of the transistor 14 is connected to the collector of a transistor 18 and of another transistor 20. The base of the transistor 18 is connected to the base of a transistor 22. The bases of the transistors 18 and 22 are connected to a source of bias potential. The emitters of the transistors 18 and 22 are connected to the emitter of a transistor 24 by way of respective resistors 26 and 28. The base of the transistor 24 is connected to the emitter of the transistor 14. The collector of the transistor 24 is connected to the terminal 10 by way of a resistor 30. The emitter of the transistor 24 is connected to the collector of a transistor 32 whose base connection 31 is the clock input connection to the described logic circuit. The emitter of the transistor 32 is connected to the terminal 12 by way of a constant current source 34. The constant current source 34 may take any known form including a relatively high resistance and, for the purposes of the subsequent description, may be considered to deliver a current of 2I. The emitter of the transistor 32 is also connected to the emitters of transistors 36 and 38 by way of respective resistors 40 and 42. The bases of the transistors 36 and 38 are connected together and are connected to a second bias point which is of lower voltage than the bias point applied to the bases of the transistors 18 and 22.

The collector of the transistor 36 is connected to the emitters of transistors 44 and 46. The base of the transistor 44 is connected to the negative terminal by way of a resistor 48 and to the emitter of a transistor 50. The collector of the transistor 50 is connected to the terminal 10. The base of the transistor 50 is connected to the collectors of the transistors 22 and 46 and to the terminal 10 by way of a resistor 52.

The base of the transistor 46 is connected to the base of the transistor 20. The bases of the transistors 20 and 46 are connected to a bias point which is connected to a point of the same bias potential as the bases of the transistors 18 and 22. The collector of the transistor 20 is connected to the terminal 10 by way of resistor 53. The emitter of the transistor 20 is connected to the emitter of the transistor 54 and to the collector of the transistor 38. The base of the transistor 54 is connected to an information input point 55 and the collector thereof is connected directly to the supply terminal 10.

The collector of the transistor 44 is connected to the base of a transistor 56 and by way of a resistor 58 to the junction of the collector of the transistor 24 with the resistor 30. The collector of the transistor 56 is connected to the terminal 10 and the emitter thereof is connected to the supply terminal 12 by way of resistor 59.

The output 60 of the described circuit may be taken at the base of the transistor 44 and inverse output 62 may be taken from the emitter of the transistor 56. Since the two outputs 60 and 62 are always out of phase, that is if the output 60 is high, the inverse output 62 is low, and vice-versa, the explanation of operation of the described circuit will refer in many instances only to the output 60.

When a proper voltage is applied across the terminals 10 and 12, and with the clock input low, the circuit can take any one of four stable states as shown in the first two columns of FIG. 2, the input voltage being low and the output voltage being low, the input voltage being high and the output voltage being low, the input voltage being low and the output voltage being high, and with both the input and output voltages being high. These conditions will be analyzed and the effect of the clock pulse becoming high will be described.

Transistors 14, 50 and 56 serve as level translating devices and may be replaced accordingly by other level translating devices with appropriate bias level changes. Resistors 16, 48 and 59 are used to bias transistors 14, 50 and 56 to the proper operating currents. They could be replaced by other current limiting devices such as current sources.

The levels of transistor 14, 50 and 56 will be hereafter referred to as high or low depending on the relative voltage applied to their bases.

It is first assumed that the input 55 is low and that the output 60 is also low.

With the clock input 31 also low, the transistor 32 is off, causing the transistors 18, 22 and 24 to be off. Since the transistor 32 is off, the constant current "2I" of the source 34 flows to the emitters of the transistors 36 and 38 which are both on and each of which conducts a current "I." Since the input 55 is low, the transistor 54 is off, and the current I flows through the transistor 20 and therefore through the resistor 53. This develops a voltage which is applied to the base of the transistor 14 causing it to go to a low state of conductivity (in the operation of this circuit, the transistor 14 is never fully off). Assume that the transistor 44 is off whereby the transistor 46 is on. The transistor 46 being on, current "I" flows through the resistor 52, biasing the transistor 50 to its low state (the transistor 50 is never fully off) whereby, as postulated, the output 60 is low and not sufficient base current is available to make the transistor 44 conductive. Thus, the circuit is stable, with the information input 55 and the output 60 both being low. Since the transistor 56 is supplied base potential by way of the resistors 30, 58, and both of the transistors 24 and 44 are off, the transistor 56 exhibits a high state and the inverse output at 62 is high.

Now let it be assumed that the clock 31 continues to be low, but the information input 55 becomes high. The transistors 18, 22, 24, 32 and 44 remain off. The transistors 36, 38, and 46 remain on. The transistor 20, however, is biased off since the transistor 54 is biased on. Thus, the transistor 14 is high. The transistor 46 being on, the transistor 50 is low, keeping the transistor 44 off. The transistor 56 remains high, whereby the circuit is stable in this mode of operation without any change in the outputs.

Now assume that initially the clock is low, that the input 55 is low, but that the output 60 is high. The transistors 18, 22, 24, 32, 46 and 54 are all off. The transistors 20, 36, 38 and 44 are on. The transistors 14 and 56 are low and the transistor 50 is high. Thus, sufficient base current flows to keep the transistor 44 conductive, and the circuit is stable under these conditions.

Now assume the clock continues to be low, but the information terminal 55 becomes high. The transistors 18, 22, 24, 32 and 46 remain off. The transistors 36, 38, and 44 remain on. The transistor 54, however, is biased on and the transistor 20 is off. Thus, the transistors 14 and 50 are high and transistor 56 remains low. The circuit is stable in this state. Therefore the described circuit is stable in any one of its four states with the clock terminal 31 low.

Now let it be assumed that the clock 31 goes high while the information input 55 and the output voltage 60 are both low. The transistor 32 goes on and a current path is provided for the transistors 18, 22 and 24. The transistor 24 cannot go on since the transistor 14 is in its low state. However, the transistors 18 and 22 go on and each conduct a current of I (one-half the current 2I from the transistor 32). The transistor 18 going on keeps the transistor 14 in its low state. Transistors 18 and 22 becoming conductive, no current remains for the transistors 36 and 38, as supplied by the constant current source 34, and the transistors 20, 44, 46 and 54 also go off. The transistor 56 is high since transistors 24 and 44 both are off and very little current flows through resistors 30 and 58. Therefore, when the input 55 and the output 60 are low, and the inverse output 62 is high, and the clock pulse goes high, there is no change in the outputs.

Let it be assumed that the input 55 is high and the output 60 is low when the clock 31 goes high. The transistor 14 was in its high state when the clock 31 went high. The clock 31 going high makes the transistor 32 conductive, providing a current path for the three transistors 18, 22 and 24. Current (2I) flows in the transistor 24 since base current thereof is provided by the transistor 14. This causes the transistors 18 and 22 to be biased off. At the same time, the transistors 36 and 38 are off and therefore the transistors 20, 44, 46 and 54 go off. The transistor 14 stays in its high conductive state and the transistor 50 assumes its high conductivity state since the transistors 22 and 46 both are off. As a result, the output 60 goes high. Since the transistor 24 is conductive the transistor 56 goes low (the transistor 56 is never fully off) and the inverse output 63 is low. Therefore, when the clock 31 goes from its low to high state while the output 60 is low and the input 55 is high, the output 60 goes high.

Let us next assume that the input 55 is low and the output 60 is high when the clock 31 goes from its low to high voltage. Then the transistor 32 becomes conductive, providing current paths for the transistors 18, 22 and 24. Since the transistor 20 was on when the clock 31 went high, the transistor 14 is in its low state and transistor 24 is off. The transistors 18 and 22 are both conductive (each with a current I), both together drawing enough current (2I); so that the constant current from the source 34 all flows to the transistor 32 and no current is left for the transistors 36 and 38, which thereby go off, making nonconductive the transistors 20, 44, 46 and 54. The connection of the collector of the transistor 18 to the base of the transistor 14 keeps the transistor 14 at its low state so that the transistor 24 is held off. The transistor 22 being conductive causes the transistor 50 to be in its low state. Therefore, when the input is low and the output 44 is high when the clock 31 goes high, the output 60 goes low. At the same time, with both of the transistors 24 and 44 off, the transistor 56 is high and the output 62 is high.

Finally, assume the input 55 is high and the output 60 is high when the clock 31 goes from its low to its high state. Due to the input 55 being high just prior to the clock becoming high, the transistor 14 is in the high state whereby the transistor 24 is on. When the clock goes high, the transistors 36, 38, 20, 44, 46 and 54 are off. The transistors 22 and 18 are off since the transistor 24 is on, and the transistor 14 stays high and the transistor 50 stays high whereby the output at 60 is high. Therefore, when the input 55 and the output 60 are both high when the clock 31 goes from low to high voltage state, the output 60 stays high. All the above described operations remain as described as long as the several inputs are not changed.

As noted from the foregoing, whenever the transistor 24, conducts, the full 2I current flows through it, but when the transistors 18, 20, 22, 44 and 46 conduct only a current of I flows through such transistors. To prevent these different currents from being reflected as different level or logic swings at the emitters of the transistors 14, 50 and 56, the resistors 52 and 53 are of equal value, which may be considered a value "R." The resistors 30 and 58 then each have a value of ½R. As a result, the changes in level translated by the transistors 14, 50 and 56 are the same for all of the various states of the circuit which have been described.

A glance at FIG. 2 gives the operation of the circuit of FIG. 1. This is, FIG. 2 is a truth table for the circuit of FIG. 1. In FIG. 2, the zeros indicate low voltage and the ones indicate high voltage. As shown by the row of three zeros if the input information is low and the output is low while the clock is low, as shown in the first two columns of FIG. 2, the clock going high makes no change in the output voltage as shown in the last column of FIG. 2. The other rows are self-explanatory. The going from high to low of the clock 31 does not change the output. The input 55 does not by itself change the output 60. In effect, the previously gathered information is retained while the clock voltage is low and the new information is set into the described circuit when the clock voltage goes high.

Figure 3:
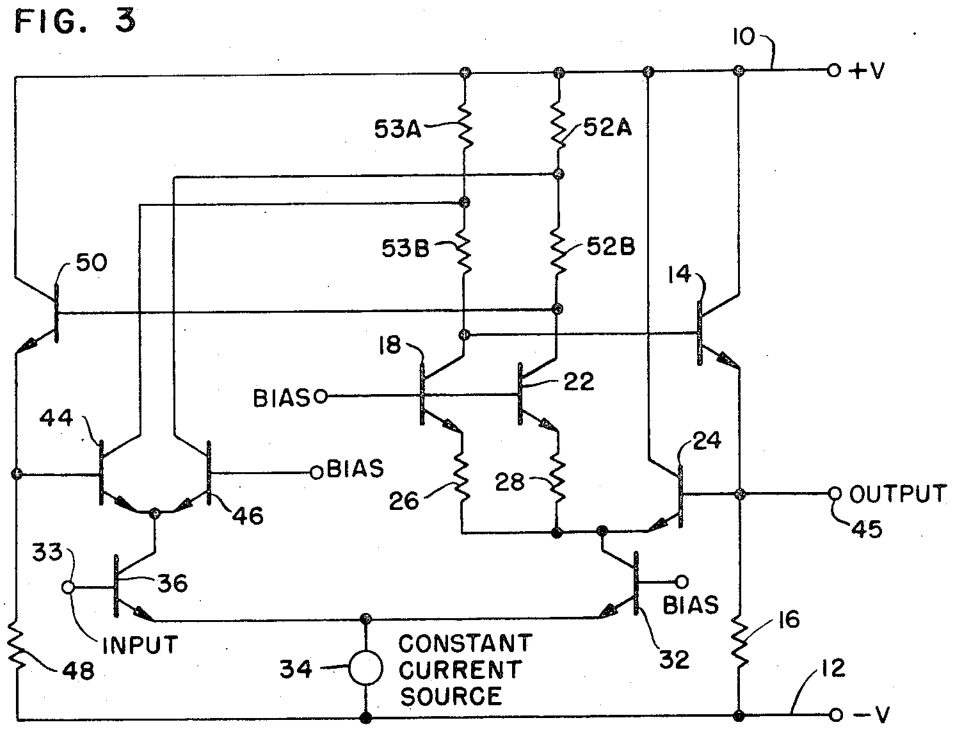
FIGS. 3 to 8 are schematic diagrams of other embodiments of this invention.

In FIG. 3 there is shown another embodiment of the circuit which operates as a frequency divider or "toggle" flip-flop circuit. The circuit of FIG. 3 is substantially the same as the circuit shown in FIG. 1 except that the information input 55 to the circuit no longer is utilized so that the transistors 20, 54 and 38 along with the resistor 42 have been eliminated. As a consequence, conductivity of the feedback transistor 14 is controlled by the transistor 18 as in FIG. 1, and in addition is controlled by the transistor 44. The resistors 52 and 53 each have been divided into two equal resistors 52A, 52B and 53A, 53B with each of these resistors having a resistance of ½R. This is done to preserve the constant level or logic swings of the inputs supplied to the bases of the feedback level translation transistors 14 and 50.

The operation of the divider circuit of FIG. 3 now will be described. The input wave applied may be a wave often used in logic circuits which varies rapidly between two voltage levels at a periodic rate. The input terminal 33 corresponds in function to the clock input terminal 31 of FIG. 1, with the exception that a constant bias is applied to the base of the transistor 32 in FIG. 3, and the input signals are applied to the base of the transistor 36. The differential current gating operation of the transistors 32 and 36, however, is the same in the circuit shown in FIG. 3 as in the circuit of FIG. 1 which has been described. Assume initially that the input terminal 33 is at a low voltage, and that the output terminal 45 is also at a low voltage. Then the transistors 36, 44 and 46 are off and the transistors 32, 18 and 22 are on. Since the output 45 is low, the transistor 24 is off and the transistor 14 which is never fully off is in its low conductivity state. The transistor 24 is off because there is insufficient base current for it since the transistor 14 is low. The transistor 50 is in the low conductivity state since the collector voltage of the on transistor 22 is low. The transistor 14 is low since the base potential, which is derived from the collector of the on transistor 18 is low. Since the logic level, that is the voltage at the terminal 45, is determined by the conductive state of the transistor 18, the voltage at the output terminal 45 is low. Resistor 16 could be replaced by a current source with little change in operation.

Now assume that the wave applied at the terminal 33 goes high. The transistor 36 is made conductive or turned on providing collector to emitter paths for the transistors 44 and 46. The transistor 46 goes on. The transistor 44 stays off since the transistor 50 is in its low conductivity state whereby there is insufficient base current for the transistor 44. Since the transistor 44 is now off, all the current (2I) provided by the constant current source 34 goes through the transistor 46. The transistors 32 and thus the transistors 18, 22 and 24 are off. Thus, the transistor 14 goes to its high conductivity condition since both of the transistors 18 and 44 are off, whereby the terminal 45 goes to its high voltage value.

Now assume that the wave applied at the terminal 33 goes low while the transistor 14 is in its high state. Then the transistors 36 and 46 which were on go off and the transistor 44 which was off stays off. The transistor 32 which was off goes on; and since the transistor 14 is high, the transistor 24 goes on. Transistors 18 and 22 stay off since the transistor 24 is on. The voltage at the output 45 stays high. With both of the transistors 46 and 22 off, the bias on the base of the transistor 50 becomes high and biases the transistor 50 to its high conductivity state.

Now assume that the input 33 again goes high, then transistor 36 goes on and transistor 44 goes on since the transistor 50 is in its high conductivity state. The transistor 46 stays off since there is no current supply for it, the transistor 44 being on. The transistors 32, 18, 22 and 24 go off. As stated, the transistor 44 goes on drawing increased current (2I) through the resistor 53A (½R), decreasing the voltage on the base of the transistor 14 whereby it goes to its low condition and the output 45 is now low. As will be noticed, there are two cycles of input at 33 which produce only one cycle of output at 45, whereby the device of FIG. 1 acts as a divide-byptwo frequency divider.

It will be noted that the emitter follower transistor 14 acts as a level shifter for the output of the divider of FIG. 1.

Figure 4:
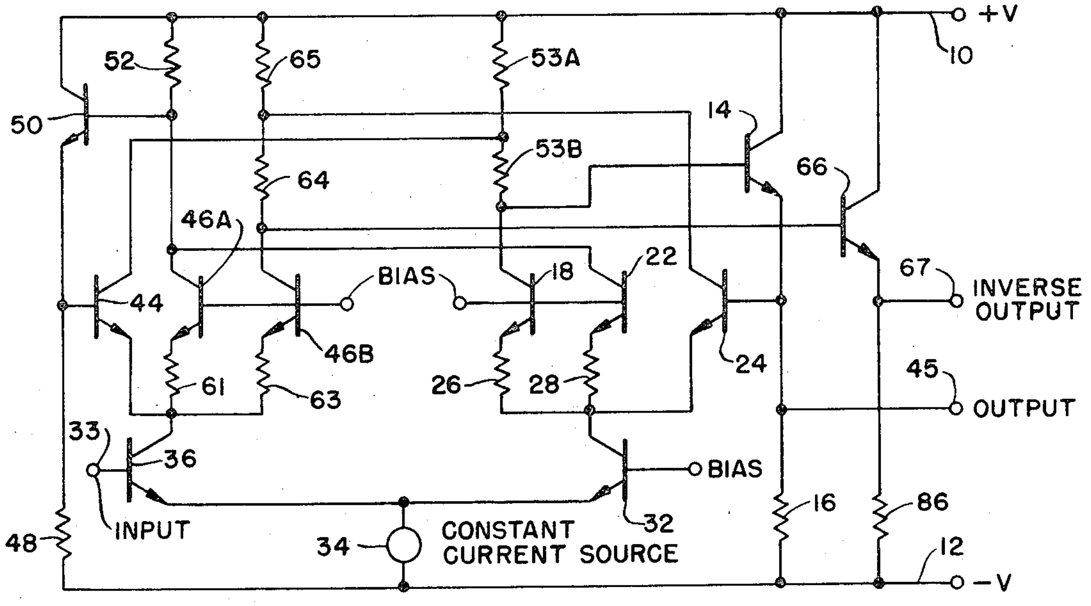

The circuit of FIG. 4 is similar to the circuit of FIG. 3 and operates in a similar manner but has been modified to provide both the normal output 45 of FIG. 1 and an inverse output 67 which changes state on the same edge of the input signal as the change of state in the output 45. To accomplish this, the transistor 46 has been split into two sections 46A and 46B, with a common bias supplied to the bases of these two sections. The emitters of the transistors 46A and 46B are connected to the collector of the differential current switching gate transistor 36 by means of resistors 61 and 63, respectively. The circuit geometry of the circuit of FIG. 4 permits the resistor 52 once again to be a single resistor having a value R, with the conductivity of the transistor 50 being controlled by the conduction of the transistor 46A and the resistor 22.

To provide the inverse output 67, an emitter follower output transistor 66 is utilized. An additional pair of resistors 64 and 65 (each having a resistance value of ½R) connect the collector of the transistor 46B to the V+ lead 10. The junction between the resistors 64 and 65 is coupled to the collector of the transistor 24, so that the conductivity of the transistor 24 also is utilized to control the conductive state of the transistor 66.

The operation of this circuit shown in FIG. 4, for the components having the same reference numbers as those shown in FIG. 3, is the same as for the operation described above in conjunction with FIG. 3. It should be noted that whenever either the transistor 24 or the transistor 46B is conductive, the transistor 66 is in its low state of conduction; and when both of the transistors 24 and 46B are nonconductive, the transistor 66 is in its high state of conduction. Similarly, whenever either the transistor 46A or the transistor 22 is conductive, the transistor 50 is in a low state of conduction; and whenever the transistors 46A and 22 both are nonconductive, the transistor 50 is in its high state of conduction. The conductivity of the transistor 14 is controlled in the same manner as described previously in conduction with FIG. 3.

The circuit of FIG. 4, like that of FIG. 3, operates as a divide-by-two frequency divider for signals applied to the input terminal 33 at the base of the transistor 36 in the differential current switching gate comprised of the transistors 32 and 36. The resistor 86 connecting the emitter of the transistor 66 with the —V terminal 12 is employed in a manner similar to the resistors 16 and 48 coupled to the emitters of the transistors 14 and 50, respectively.

From the foregoing description of the circuits of FIGS. 1, 3 and 4, it is apparent that the uniform level translation of the signals obtained from the level translation transistors 14, 50, 56 and 66 is effected by a selection of the relative values of the resistors 30, 52, 53, 64 and 65 which are used in the various circuits. The use of these resistors results in the consumption of a relatively large amount of chip area when the circuits are fabricated as monolithic integrated circuits.

Figure 5:
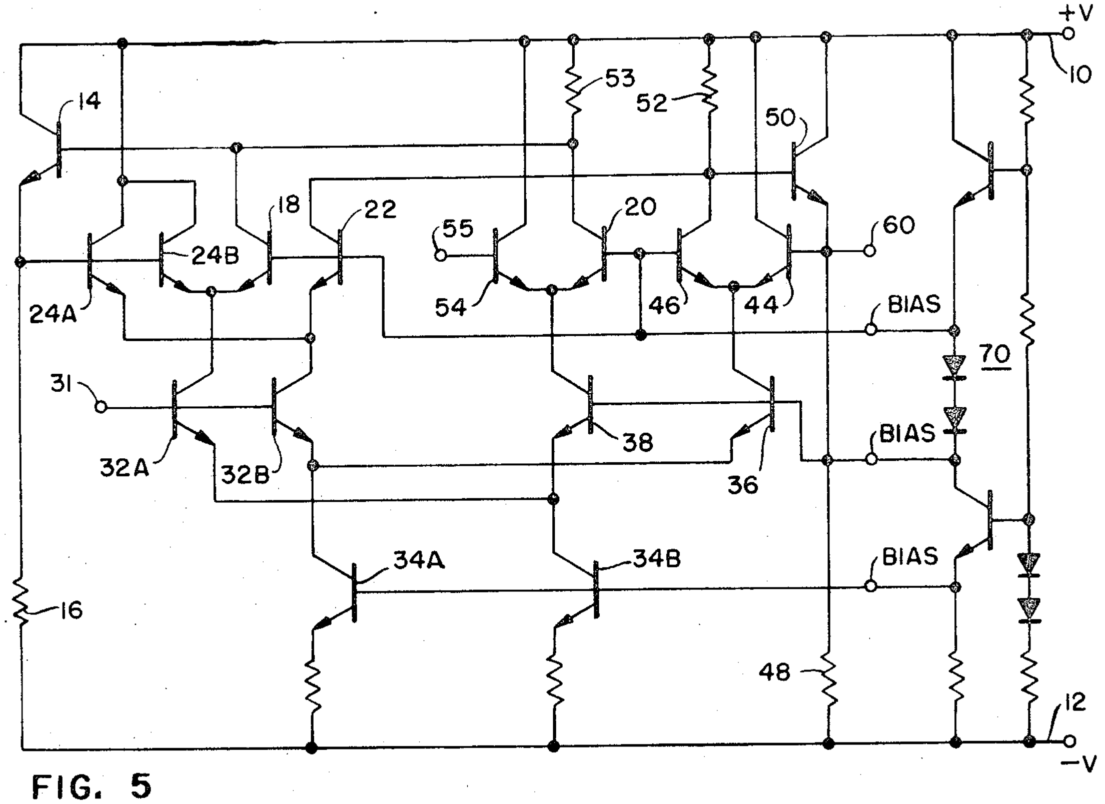
Figure 6:
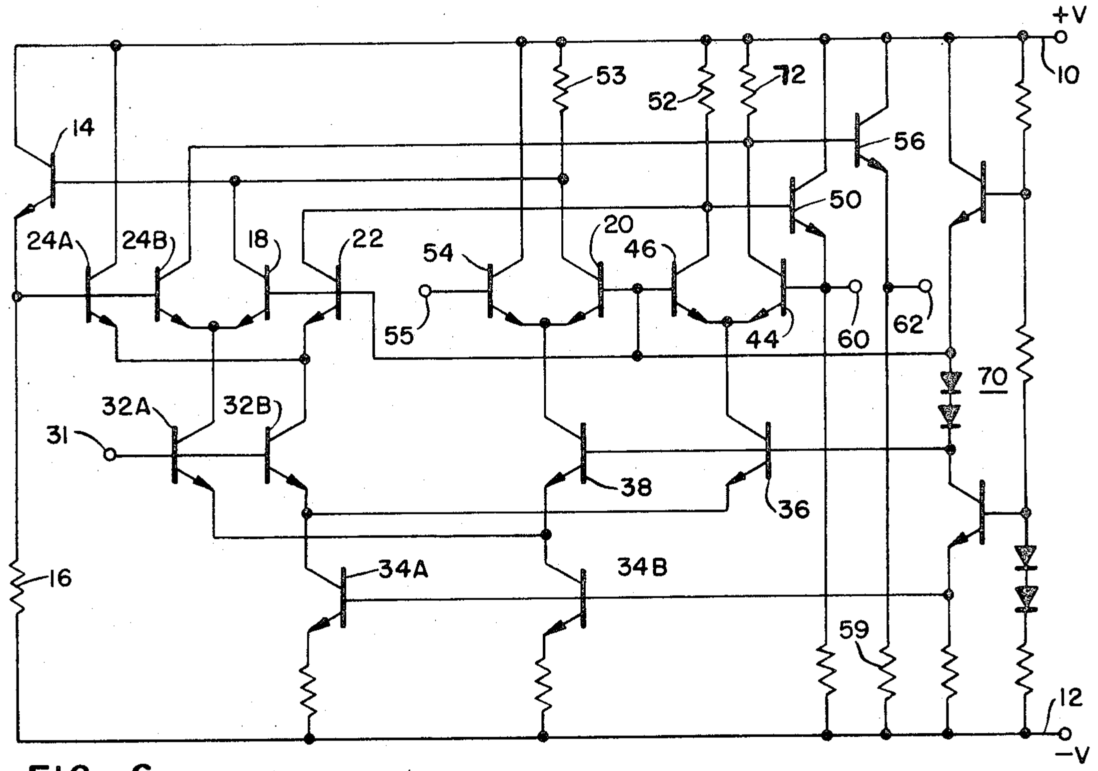
Figure 7:
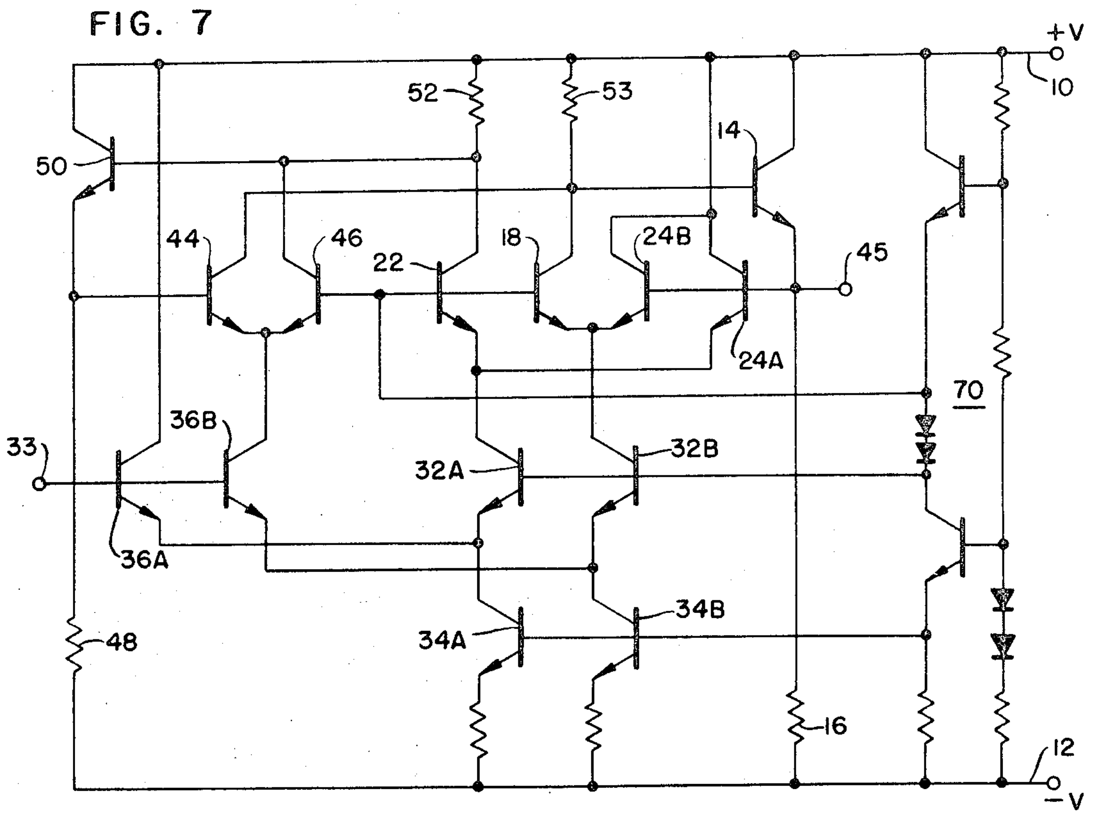
Figure 8:
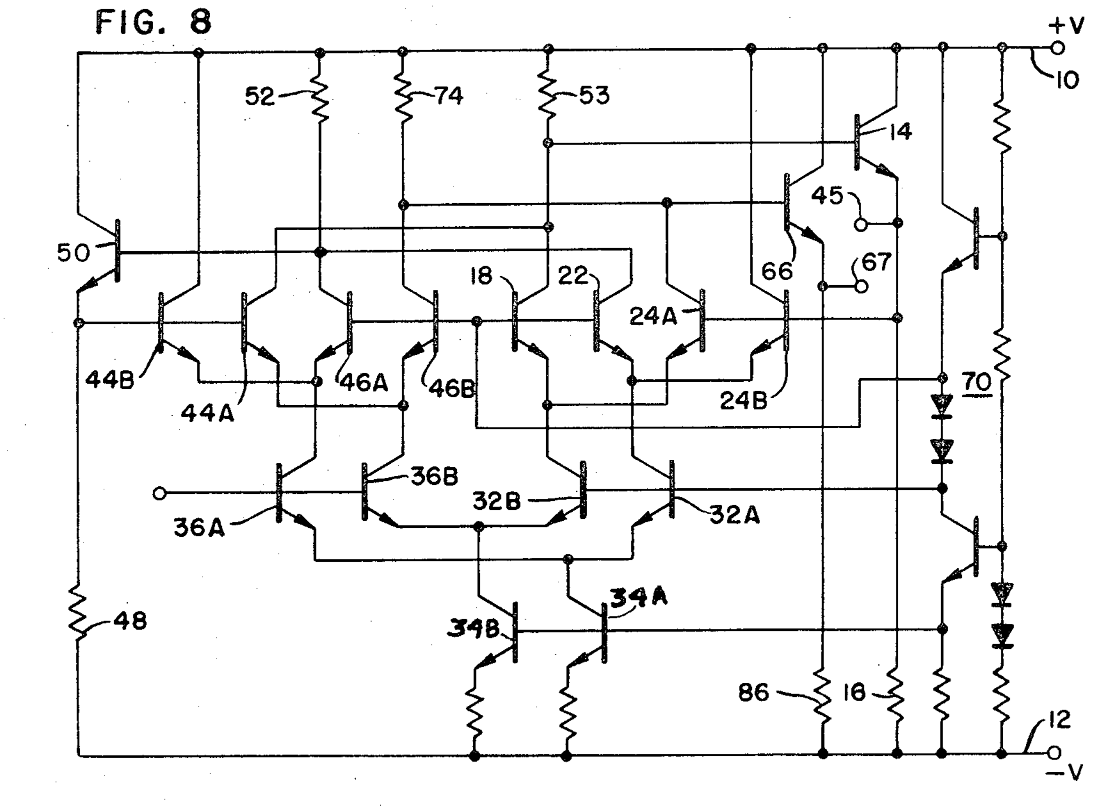

To reduce the chip area needed to implement the circuits in monolithic integrated circuit form, it is helpful to reduce, insofar as possible, the number and size of resistors which are needed in the circuit. This can be accomplished by splitting the constant current source 34 into two current sources, each supplying a current which is one-half the value of the current provided by the current source 34, that is, two current sources each providing a current of "I" value. When this is done, it also is necessary to divide the differential current switching gate 32, 36 or 32, 36, 38 into two different parts, each of which is supplied with current by one of the two current sources. The circuits shown in FIGS. 5 and 7 illustrate the manner in which this is done for logic circuits and frequency dividers comparable, respectively, to the circuits shown in FIGS. 1 and 3 and previously described. FIGS. 6 and 8 are variations of the circuits of FIGS. 5 and 7 showing the manner of obtaining both normal and inverted outputs. Similar circuit components of FIGS. 5 to 8 are provided with the same reference numbers which previously have been used in FIGS. 1, 3 and 4.

Referring first to FIG. 5, it may be seen that the current source 34 of FIG. 1 has been divided into two current sources 34A and 34B, each controlled by the same bias point on a conventional reference voltage source 70, which also provides the other bias points for the circuit. The reference voltage source 70 is merely included for purposes of illustration and the same type of voltage source may be used in the circuits shown in FIGS. 1, 3 and 4. The current source transistors 34A and 34B each are selected to provide a current of "I" instead of the current of 2I which is provided by the current source 34 of FIGS. 1, 3 and 4. Other changes which have been made to FIG. 5 in comparison with the circuit of FIG. 1 are to cause the transistor 32 to be replaced with a pair of transistors 32A and 32B, and the bases of both of these transistors are provided with the clock signals on the terminal 31. The emitter of the transistor 32A then is coupled with the emitter of the transistor 38 to the collector of the current source transistor 34B, and the emitter of the transistor 32B is connected to the emitter of the transistor 36 at the collector of the current source transistor 34A.

When the transistors 32A and 32B are rendered conductive by clock signals on the terminal 31, each of these transistors is supplied with a current of "I" value. Similarly, when the transistors 36 and 38 conduct, each of these transistors is provided with a current of "I" value. The connections of the collectors of the transistors 36 and 38 to the remainder of the circuit are the same as previously described in conjunction with FIG. 1. The connections of the collectors of the transistors 32A and 32B are comparable to the connections of the transistor 32 in FIG. 1, but the transistor 24 also has been divided into two sections, illustrated by the transistors 24A and 24B of FIG. 5. The collectors of these transistors are connected in common to the voltage supply terminal 10, and the bases of these transistors 24A and 24B are connected in common to the emitter of the transistor 14. The collector of the differential current steering gate transistor 32A then is coupled to the emitters of the transistors 24B and 18, and the collector of the differential current steering gate transistor 32B is connected to the emitters of the transistors 24A and 22. The operation of the circuit is the same as previously described in conjunction with FIG. 1, but it is apparent that all of the transistors 18, 22, 20, 24A, 24B, 44 and 46 draw a current of "I" whenever any one of these transistors is conductive. Thus only the resistors 52 and 53, each having a value of R, are needed to provide the same level translation to the bases of the transistors 14 and 50 as provided in the circuit of FIG. 1 which employed additional resistors.

It should be noted that the circuit of FIG. 5 does not provide for an inverse output, so that the transistor 56 and the resistors 30 and 58 have been eliminated. The resistors 26, 28, 40 and 42 which were necessary because of the unbalanced nature of the differential circuits of FIG. 1 also are eliminated, so that the total area which is occupied by the circuit of FIG. 5, when fabricated in a monolithic integrated circuit form, is less than that required to form the circuit of FIG. 1.

FIG. 6 illustrates an additional modification to cause the circuit shown in FIG. 5 to provide an inverse output as well as the normal output obtained from the emitter of the transistor 50 at terminal 60. To accomplish this, the collectors of the transistors 24B and 44 are coupled through a resistor 72 (having a resistance value R) to the V+ terminal 10. The collectors of these transistors 24B and 44 also are connected to the base of a transistor 56 which operates in the same manner described previously in conjunction with FIG. 1.

Since both of the transistors 44 and 24B, when they are conductive, conduct a current of "I," only a single resistor 72 of value R is necessary. This resistor replaces the resistors 30 and 58 having a value of ½R used in FIG. 1. The two resistors and the particular circuit connections shown in FIG. 1 were required to cause the same level translation to take place in the transistor 56 when the transistors 24 and 44 conducted current, since the transistor 24 of FIG. 1 conducted a current of 2I while the transistor 44 conducted only a current of "I." The operation of the circuit of FIG. 6 is comparable to the operation of the circuit of FIG. 1 in accordance with the modifications described above in conjunction with FIG. 5, and the same reference numbers identify similar circuit components, so that this similarity of operation may be readily ascertained.

FIG. 7 is directed to a variation of the circuit of FIG. 3 for a toggle flip-flop in which the divided current sources 34A and 34B are utilized in a manner comparable to the utilization of these current sources in FIG. 5. To effect this type of divided current source in the toggle flip-flop circuit, the transistor 24 has been replaced with a pair of transistors 24A and 24B, with the collectors and bases of these transistors being connected in common to the V+ terminal 10 and the emitter of the transistor 14, respectively. The emitters of the transistors 24A and 22 are interconnected to the collector of the transistor 32B, and the emitters of the transistors 24B and 18 are interconnected to the collector of the transistor 32A.

Since with the toggle flip-flop the transistor 38 is not employed, the transistor 36 of the differential current gate of FIG. 3 also has been replaced with a pair of transistors 36A and 36B, both of which are controlled by input signals applied to the input terminal 33. The collector of the transistor 36A is connected directly to the V+ terminal 10, and the collector of the transistor 36B is connected to the emitters of the transistors 44 and 46 in a manner similar to the connections of the transistor 36 of FIG. 3. The transistors 32A and 32B are rendered conductive and nonconductive together as are the transistors 36A and 36B of the differential current steering gate provided by these transistors.

As is apparent from an examination of the circuit of FIG. 7, the operation is substantially the same as the operation of the circuit of FIG. 3 for the components having the same reference numbers, with the exception that whenever any one of the transistors 18, 22, 24A, 24B, 44 and 46 is rendered conductive, that transistor always draws a current of "I." As a result, the resistors 52 and 53, each having a value of R, are the only resistors connected to the collectors of any of these transistors; and the resistors 26 and 28 used in the circuit of FIG. 3 have been eliminated.

To provide an inverted output of the type provided in the circuit of FIG. 4 from a toggle flip-flop of the type shown in FIG. 7, the circuit of FIG. 8 is utilized. The circuit of FIG. 8 is similar to the circuit of FIG. 7, with the exception that the transistors 44 and 46 each have been replaced with a pair of transistors 44A, 44B and 46A, 46B, respectively. The collector of the differential current switching transistor 36B then is connected to the emitters of the transistors 44A and 46B while the collector of the transistor 36A is connected to the emitters of the transistors 44B and 46A. The collector of the transistor 44B is connected to the V+ terminal 10 while the collector of the transistor 44A is connected to the base of the transistor 14 and through the resistor 53 to the V+ terminal 10.

The transistor 46A provides the circuit connections supplied by the transistor 46 of FIG. 7, while the transistors 46B and 24A are connected through an additional resistor 74 of value R to the V+ terminal 10 and also to the base of an inverse output emitter follower transistor 66 of the type shown in FIG. 4. The resistor 74 of FIG. 8 replaces the pair of resistors 64 and 65 which are used in the circuit of FIG. 4, with the operation of the circuit of FIG. 8 providing the same results in the same sequence as the operation of the circuit of FIG. 4.

While the described circuits are particularly adapted to be provided on a monolithic integrated circuit chip, the circuits may be made in discrete form using separate elements.

Although only NPN transistors have been described, it should be apparent that with proper changes in supply voltage, PNP transistors also may be used if desired.

I claim:

1. A bistable multivibrator including in combination:
first and second voltage supply terminals;
a first section having at least first and second transistors each having first, second and control electrodes, the first electrodes of said first and second transistors being coupled with said first voltage supply terminal;
a second section having at least third, fourth and fifth transistors each having first, second and control electrodes, the first electrodes of said third, fourth and fifth transistors being coupled with said first voltage supply terminal;
differential current steering gate means having at least one common terminal, at least one first output terminal coupled with the second electrodes of the transistors of said first section, and at least one second output terminal coupled with the second electrodes of the transistors of said second section;

current source means coupling the common terminal of said current steering gate means with said second voltage supply terminal;

first feedback transistor means having first, second and control electrodes, with the first electrode thereof coupled with said first voltage supply terminal, the second electrode thereof coupled with the control electrode of said third transistor of said second section and coupled in circuit with said second voltage supply terminal, and the control electrode thereof coupled with the first electrode of said fourth transistor of said second section;

second feedback transistor means having first, second and control electrodes, with the first electrode thereof coupled with said first voltage supply terminal, the second electrode thereof coupled with the control electrode of said first transistor and coupled in circuit with said second voltage supply terminal, and the control electrode thereof coupled with the first electrodes of said second and fifth transistors; and means for applying bias potentials to the control electrodes of said second, fourth and fifth transistors.

2. The combination according to claim 1 wherein all of said transistors are of the same conductivity type.

3. The combination according to claim 1 further including a control transistor therein, with said control transistor having first, second, and control electrodes, the first electrode thereof coupled through impedance means to said first voltage supply terminal and coupled with the control electrode of said first feedback transistor means, the second electrode thereof coupled with said current source means; and means for rendering said control transistor conductive and non-conductive in response to input signals.

4. The combination according to claim 1 wherein said first and second feedback transistor means are connected in emitter follower circuit configurations.

5. The combination according to claim 1 further including first resistance means coupling said first voltage supply terminal with the first electrodes of said second and fifth transistors; and second resistance means coupling the first electrode of at least said fourth transistor with said first voltage supply terminal.

6. The combination according to claim 5 wherein said first and second resistance means have the same predetermined value.

7. The combination according to claim 1 wherein said current steering gate means comprises sixth and seventh transistor means, each having first, second, and control electrodes, the first electrodes of said sixth and seventh transistor means comprising said first and second output terminals, respectively, and the second electrodes of said sixth and seventh transistor means being coupled together at said common terminal.

8. The combination according to claim 7 further including means for applying a bias potential to the control electrode of one of said sixth and seventh transistor means and means coupled with the control electrode of the other of said sixth and seventh transistor means for applying a varying input signal thereto.

9. The combination according to claim 7 further including first and second resistance means wherein said first section includes an eighth transistor in addition to said first and second transistors, with said eighth transistor having first, second and control electrodes, the control electrode of said eighth transistor coupled in common with the control electrode of said second transistor, the second electrode of said eighth transistor coupled with the first electrode of said sixth transistor means, the first electrode of said eighth transistor coupled through said first resistance means with said first voltage supply terminal and the first electrode of said fourth transistor coupled through said second resistance means with said first voltage supply terminal, so that normal and inverted outputs are obtainable from the first electrodes of said fourth transistor and said eighth transistor, respectively.

* * * * *